United States Patent [19]

Matsumoto

[11] Patent Number: 5,338,251
[45] Date of Patent: Aug. 16, 1994

[54] WIND DIRECTION CONTROLLING APPARATUS

[75] Inventor: Tohru Matsumoto, Sanda, Japan

[73] Assignee: Mitsubishi Denki Kabushiki Kaisha, Tokyo, Japan

[21] Appl. No.: 965,704

[22] Filed: Oct. 23, 1992

[30] Foreign Application Priority Data

Oct. 23, 1991 [JP] Japan .................. 3-275468

[51] Int. Cl.$^5$ .................. B60H 1/34; F24F 13/15
[52] U.S. Cl. .................. 454/153; 454/285
[58] Field of Search .................. 454/153, 285

[56] References Cited

U.S. PATENT DOCUMENTS 4,339,991 7/1982 Asano et al. .

FOREIGN PATENT DOCUMENTS 55-6768  6/1953  Japan .
114119   7/1984  Japan .................. 454/153
60-81022 6/1985  Japan .

*Primary Examiner*—Harold Joyce

[57] ABSTRACT

A wind direction controlling apparatus capable of reducing variations in the level of noise which can be caused when vertical fins are at reversal points of their swinging. A rod (17) for swinging vertical fins has a portion for friction-clutch engagement, the portion having a rounded configuration (17b) satisfying the relationship of P<Q between thicknesses. Thus, the frictional force of the friction clutch is reduced in such a manner that the force is at the minimum when the clutch is at the position corresponding to normal swinging. In this way, the load acting on a geared motor (8) at the time of reversal of the vertical fins is reduced, thereby reducing variations in the noise level.

11 Claims, 7 Drawing Sheets

| | (i) | (ii) | (iii) | (iv) |
|---|---|---|---|---|
| ROLLER POSITION | ⊙ (bottom) | ⊙ (left) | ⊙ (top) | ⊙ (right) |
| ORIENTATION OF VERTICAL FINS | FRONT | RIGHT | FRONT | LEFT |

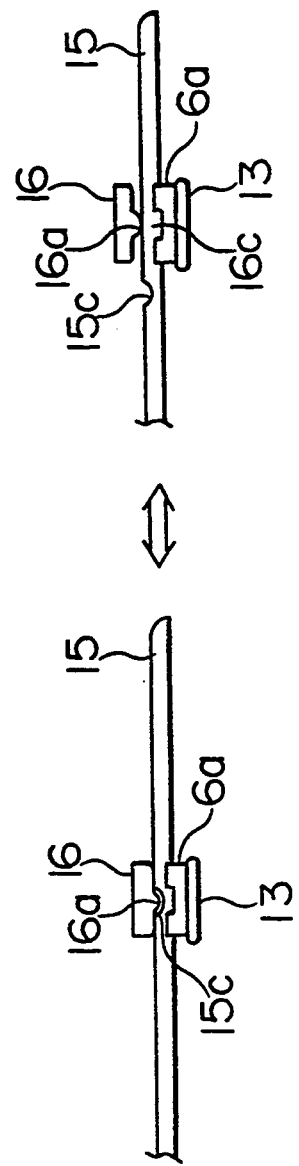

WIND DIRECTION CONTROLLING APPARATUS

BACKGROUND OF THE INVENTION

1. Field of the Invention

The present invention relates to a wind direction controlling apparatus provided at an air discharge port of an air conditioner of an automobile or the like. Particularly, the present invention relates to a wind direction controlling apparatus driven by a motor or a like drive device to automatically deflect the direction of wind from the air discharge port.

2. Description of the Related Art

FIGS. 4 through 11 show an example of a conventional wind direction controlling apparatus. Referring to these drawings, the apparatus includes a case 1 mounted on an air discharge port, not shown. As shown in FIGS. 5 and 6, a plurality of horizontal fins 2 are rotatably supported by rotary shafts 2a within the case 1 so as to deflect wind from the air discharge port in vertical directions (i.e., up and down). Pins 2b at the respective inward edge portions of the horizontal fins 2 are rotatably passed through a first joint 3 (comprising two joint members in the illustrated example) so that the horizontal fins 2 are pivotally joined to the first joint 3. A plurality of vertical fins 4 are swingably supported by rotary shafts 4a within the case 1 in such a manner as to be swingable about the rotary shafts 4a and thus be able to deflect wind from the air discharge port in horizontal directions (i.e., left and right). Dials 5 are provided integrally with some of the vertical fins 4 so as to manually operate the vertical fins 4. Pins 4b at the respective inward edge portions of the vertical fins 4 are rotatably passed through a second joint 6 (comprising two joint men, hers) so that the vertical fins 4 are pivotally joined to the second joint 6. The angle by which the vertical fins 4 can be operated is limited by the abutment of one of the ends of the second joint 6 on an inner side surface of the case 1. A machine room 7 is defined within the case 1 at a substantially central location thereof. A geared motor 8, serving as a drive device, is elastically accommodated in the machine room 7 through a cushioning material 9. As shown in FIGS. 7 and 9, the geared motor 8 has an output shaft 10, to which a drive roller 11 is fixed. As shown in FIGS. 5 and 8, a rod 12 has an elongated hole portion 12a formed at a substantially central position thereof and kept in link-engagement with an eccentric pin 11a of the drive roller 11. Since the wind direction controlling apparatus has structures of substantially the same construction on either side of the machine room 7, only one of the structures will be described.

As best shown in FIG. 6, the rod 12 is disposed in such a manner as to overlap with and engage with a hook-shaped engagement portion 6a at an inward edge portion of the second joint 6 below the rod 12. A plate spring 13 is bent into a shape having a substantially U-shaped cross-section, and a cap 14 is fitted on an end portion of the plate spring 13. The plate spring 13 has a resilience by virtue of which the spring 13 exerts a clamping force, which force is transmitted through the cap 14 to the rod 12. Thus, a clutch is formed between the rod 12 and the second joint 6, providing the function of frictional engagement.

The operation of the conventional wind direction controlling apparatus will be described.

When the geared motor 8 is energized, the output shaft 10 and the drive roller 11 fixed to it are rotated. As the drive roller 11 rotates in the direction X shown in FIG. 4, the rod 12, in link-engagement with the eccentric pin 11a, reciprocates linearly in the directions Y shown in FIG. 4. The linear reciprocation of the rod 12 causes, through the caps 14 and the plate springs 13, the second joint 6 to swing back and forth, which in turn causes the vertical fins 4 to swing in the directions indicated by the arrows R in FIG. 4. Consequently, wind from the air discharge port is automatically deflected continuously in horizontal directions to blow in the associated space. For instance, the deflected wind blows in the interior of an automobile toward the driver's and assistant's seats.

When the geared motor 8 is at rest, the vertical fins 4 can be oriented in a desired horizontal orientation within a certain range by suitably operating the associated dial 5, thereby causing the friction clutch section, comprising the cap 14 and the plate spring 13, and the joint member 6 to slide on the rod 12 until the desired orientation is achieved. The horizontal fins 2 can be manually oriented in a desired vertical orientation within a certain range.

The conventional wind direction controlling apparatus having the above-described construction entails the following problem. When the vertical fins 4 are oriented to the maximum extent, for example, oriented to the right extreme, as shown FIG. 8, at the time point at which the end of the joint member 6 abuts on an inner side surface of the case 1 (with the position of the eccentric pin 11a of the drive roller 11 corresponding to that shown in FIG. 10(a)-(ii)), force A of a magnitude corresponding to that of the frictional force of the friction clutch section acts on the geared motor 8. Since the geared motor 8 is elastically accommodated in the machine room 7 through the cushioning material 9, the geared motor 8 is tilted in the direction B shown in FIG. 9.

At such times, the load on the geared motor 8 causes periodical increases in the level of noise generated by the reduction gear of the motor 8 (the noise will hereinafter be referred to as "the gear noise"), as shown in FIG. 10(b), and the gear noise can be very discomforting.

In order to eliminate the above problem, the frictional force of the friction clutch section may be reduced. However, if, for this purpose, the thickness of the rod 12 is reduced simply over the entire range thereof, so as to reduce the amount by which the U-shaped plate spring 13 is deflected in the direction in which it is opened, the rigidity of the rod 12 may decrease, particularly at high temperatures, and the rod 12 may be deformed to cause operational failure.

The above problem may be eliminated by adopting the construction shown in FIGS. 11(a) and 11(b). Here, a rod 15 has a recess 15c formed therein, the recess 15c normally engaging with a projection 16a of a cap 16. The friction clutch of the construction is positioned in such a manner that the end of the joint 6 is kept at a neutral position at which the joint 6 does not abut on an inner surface of the case 1 even when the vertical fins 4 are at a reversal point of their swinging during the operation of the geared motor 8. With this arrangement, it is possible to reduce variations in the load on the geared motor 8 which can be caused at the time of reversal of the vertical fins 4. However, in a manual operation for adjusting the orientation of the vertical fins 4, it is necessary to cause the projection 16a of the cap 16 to clear the recess 15c of the rod 15, as shown in FIG. 11(b). This is disadvantageous in that a relatively great force is inevitably applied before the clearing action, and, thereafter, the resultant reaction may cause a great change in the angle of orientation of the vertical fins 4. Thus, it is difficult to perform fine adjustment of orientation; besides, the force required for the operation changes before and after the clearing action, thereby failing to provide good operability.

SUMMARY OF THE INVENTION

The present invention has been accomplished to overcome the above-described problem. An object of the present invention is to provide a low-noise and highly-reliable wind direction controlling apparatus capable of reducing the load on a geared motor at the time of reversal of vertical fins, thereby reducing variations in the level of noise.

In order to achieve the above object, according to one aspect of the present invention, there is provided a wind direction controlling apparatus including a rod for swinging vertical fins, the rod having a portion for friction-clutch engagement whose thickness is smoothly reduced.

According to another aspect of the present invention, there is provided a wind direction controlling apparatus including a rod for swinging vertical fins, the rod having a portion for friction-clutch engagement whose surface roughness is varied.

With the wind direction controlling apparatus according to the first aspect of the present invention, the force with which a friction clutch section presses against the rod is reduced, so as to reduce the load acting on the drive device at the time of reversal of the vertical fins, thereby reducing variations in the level of gear noise generated by the drive device.

With the wind direction controlling apparatus according to the second aspect of the present invention, the coefficient of friction between a friction clutch section and the rod is so varied as to reduce the load acting on the drive device at the time of reversal of the vertical fins, thereby reducing variations in the level of gear noise generated by the drive device.

BRIEF DESCRIPTION OF THE DRAWINGS

FIGS. 11(a) and 11(b) are views showing another example of a conventional wind direction controlling apparatus.

DESCRIPTION OF THE PREFERRED EMBODIMENTS

Figure 1:
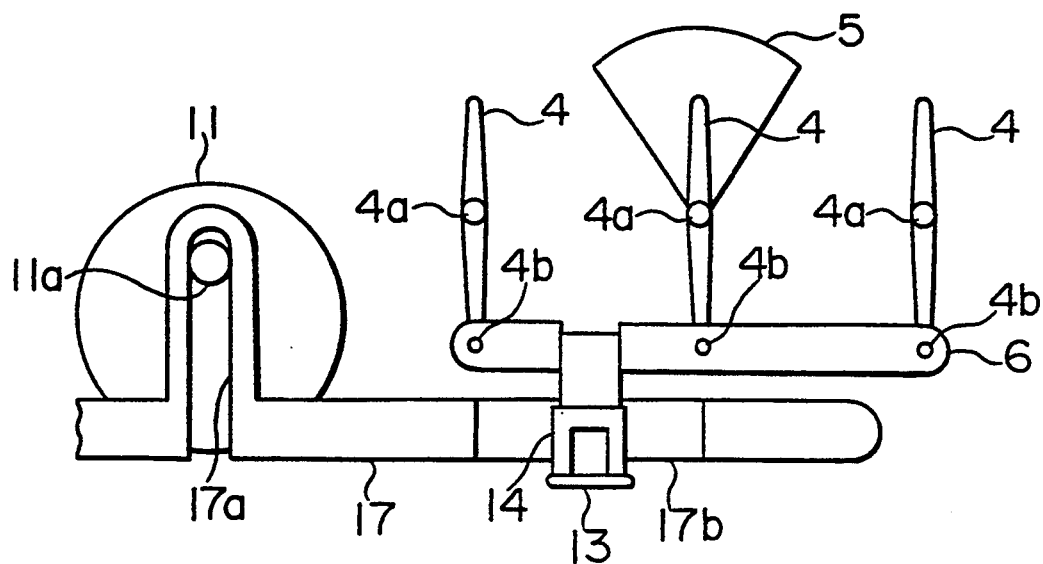
FIG. 1 is a plan view showing a friction clutch section of a wind direction controlling apparatus according to an embodiment of the present invention.
Figure 2:
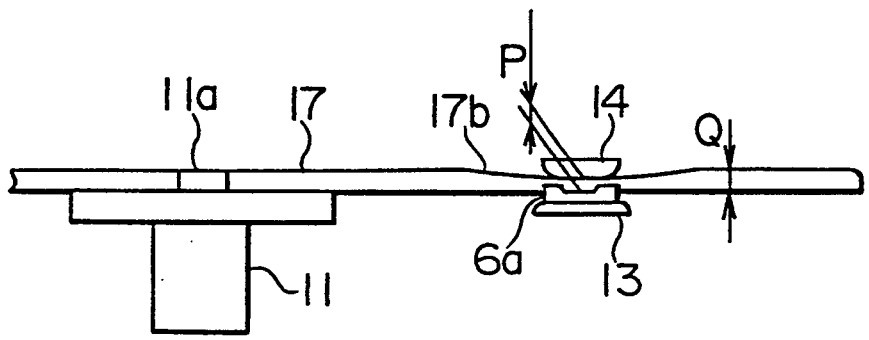
FIG. 2 is a rear side view of the clutch section shown in FIG. 1.

An embodiment of the present invention will be described with reference to FIGS. 1 and 2. In these drawings, elements which are the same as or correspond to those of the conventional apparatus are denoted by identical reference numerals, and their description will be omitted.

A wind direction controlling apparatus according to the embodiment includes a rod 17 having an engagement range within which the rod 17 engages with a friction clutch section. The thickness of the rod 17 within the engagement range is gradually reduced by forming a rounded configuration 17b in such a manner that the relationship of $P<Q$ is satisfied between the reduced thickness P and non-reduced thickness Q of the rod 17, as shown in FIG. 2. During normal swinging operation, the hook-shaped engagement portion 6a at an inward edge portion of the second joint 6 is positioned below and overlaps with substantially the central area of the engagement range having the rounded configuration 17b, and thus engages with that area. An elongated hole portion 17a formed at a substantially central position of the rod 17 is kept in link-engagement with the eccentric pin 11a of the drive roller 11.

With the above-described wind direction controlling apparatus, the amount of deflection of the plate spring 13 assumes the minimum at the center of the rounded configuration 17b. Accordingly, this position entails a smaller load on the geared motor 8 at the time of reversal of the vertical fins 4 than the load entailed by any other positions on the rod 17, thereby making it possible to reduce variations in the level of gear noise. Since the thickness of the rod 17 is reduced only at a portion corresponding to the friction clutch section, the rigidity of the entire rod 17 does not decrease, thereby assuring that the apparatus reliably functions as a wind direction controlling apparatus.

Another embodiment will be described with reference to FIG. 3.

Figure 3:
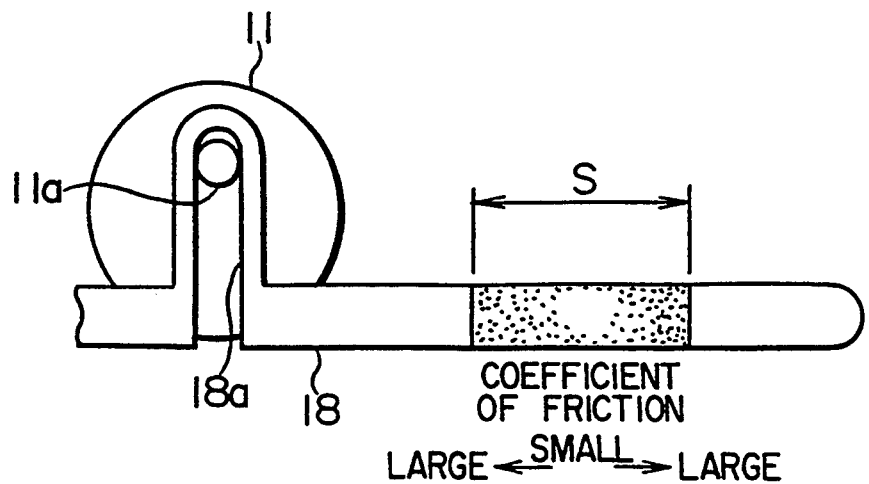
FIG. 3 is a plan view showing a friction clutch section of a wind direction controlling apparatus according to another embodiment of the present invention.
Figure 4:
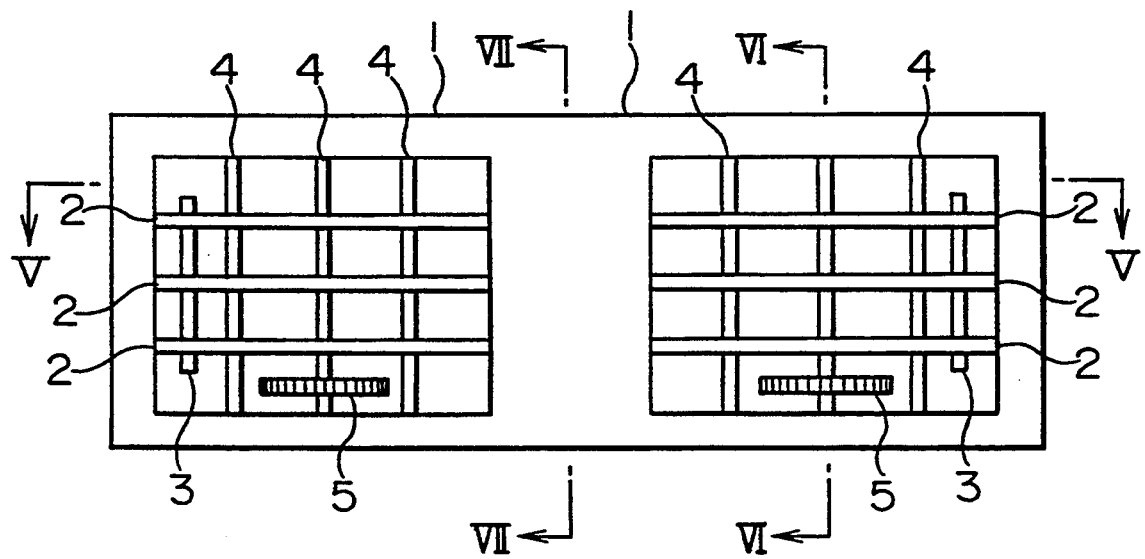
FIG. 4 is a front view of an example of a conventional wind direction controlling apparatus.
Figure 5:
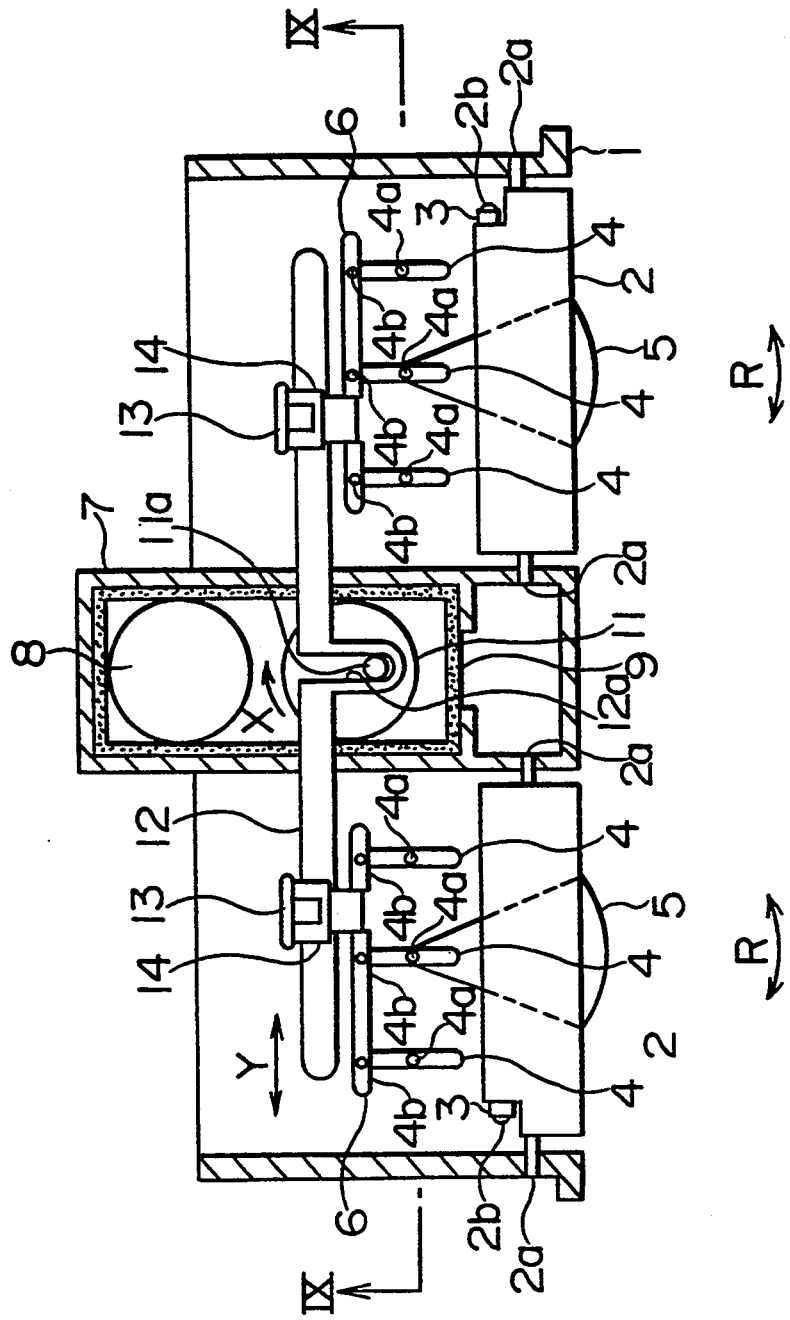
FIG. 5 is a sectional view taken along the line V—V shown in FIG. 4.
Figure 6:
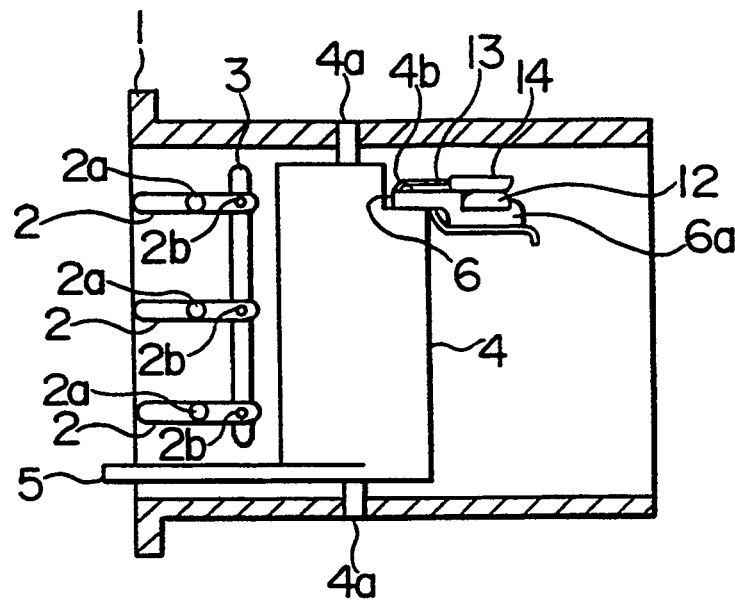
FIG. 6 is a sectional view taken along the line VI—VI shown in FIG. 4.
Figure 7:
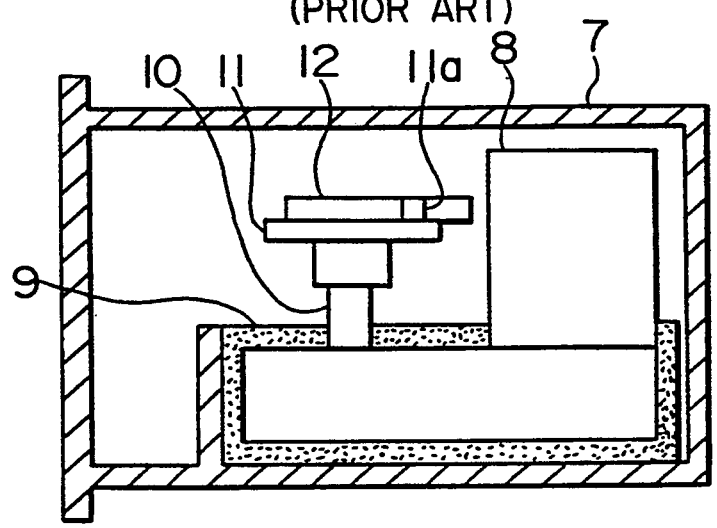
FIG. 7 is a sectional view taken along the line VII—VII shown in FIG. 4.
Figure 8:
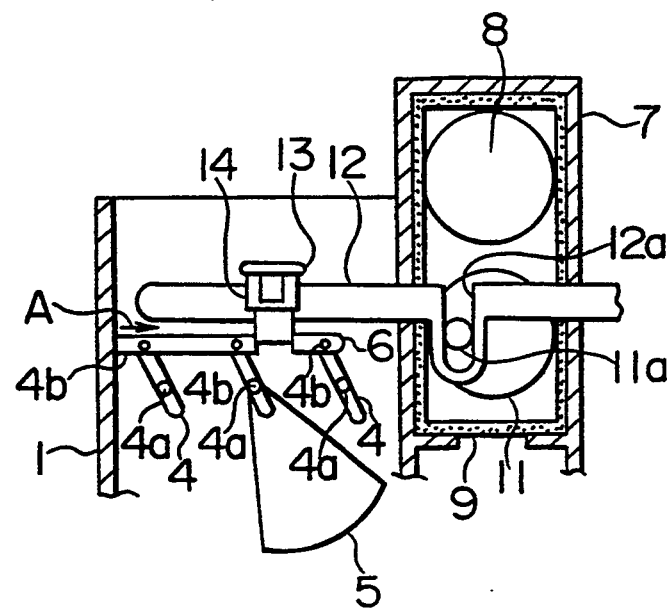
FIG. 8 is a fragmentary sectional view showing the operation of vertical fins of the conventional apparatus shown in FIG. 4.
Figure 9:
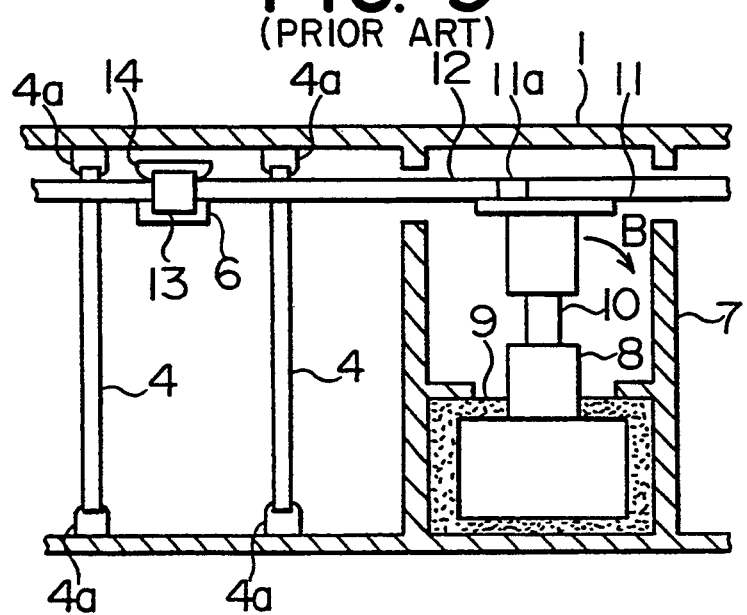
FIG. 9 is a sectional view taken along the line IX—IX shown in FIG. 5.
Figures 10A, 10B:
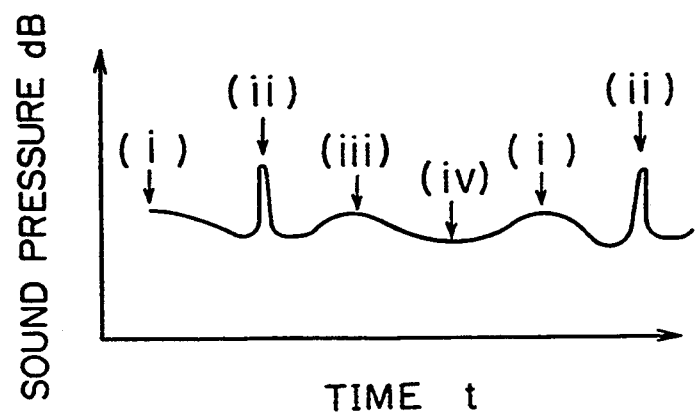
FIGS. 10(a) and 10(b) show the relationship between the position of an eccentric pin of a drive roller of the conventional apparatus shown in FIG. 4 and the level of noise.

Referring to FIG. 3, a wind direction controlling apparatus according to this embodiment includes a rod 18 having an engagement range S for engagement with a friction clutch section. The embodiment is characterized in that the surface roughness of the engagement range S is varied in such a manner that the coefficient of friction is the minimum at the center of the engagement range S.

With the above-described wind direction controlling apparatus, the frictional force of the frictional clutch section assumes the minimum at the position corresponding to normal swinging of the joint 6 so that, at this position, the load acting on the drive device at the time of reversal of the vertical fins 4 is smaller than at any other positions on the rod 18, thereby making it possible to reduce variations in the level of gear noise. Further, the rigidity of the rod 18 is not decreased, thereby assuring the reliability of the apparatus for functioning as a wind direction controlling apparatus.

As has been described above, according to the present invention, the frictional force of the friction clutch section is reduced in such a manner that the force is at the minimum at the position corresponding to normal swinging of the joint. Therefore, it is possible to reduce the load on the drive device at the time of reversal of the vertical fins, to thereby reduce variations in the level of gear noise of the drive device. Since the above reduction is achieved without any substantial decrease in the rigidity of the rod, it is possible to realize a low-noise wind controlling apparatus with a simple construction and without any substantial increase in the costs for component parts, the apparatus being also advantageous in that it is highly reliable and provides improved operability during manual operation of the vertical fins.

What is claimed is:

1. A wind direction controlling apparatus comprising:
    a case mounted on an air discharge port;
    a plurality of fins disposed in said case for deflecting wind from the air discharge port; a joint to which said fins are linked and pivotally joined; a rod coupled to said joint via a friction clutch section;
    drive means, connected to said rod, for reciprocating said rod, wherein
    said rod engages with said friction clutch section within a range greater than the width of said friction clutch section, said rod within said range being formed with a reduced thickness and continuous curvatures from both ends of said range to a point within said range.

2. The wind direction controlling apparatus of claim 1 wherein said rod is formed with a continuous curvature from one end of said range to the other end of said range.

3. A wind direction controlling apparatus comprising:
    a case mounted on an air discharge port;
    a plurality of fins disposed in said case for deflecting wind from the air discharge port;
    a joint to which said fins are linked and pivotally joined;
    a rod coupled to said joint via a friction clutch section;
    drive means connected to said rod for reciprocating said rod, wherein
    said rod has a range within which said rod engages with said friction clutch section, said rod within said range being formed with varied surface roughness.

4. The wind direction controlling apparatus of claim 3 wherein said varied surface roughness of said rod within said range creates a higher coefficient of friction at the outer area of said range than at the center of said range.

5. A wind direction controlling apparatus comprising:
    a case mounted on an air discharge port;
    a plurality of pivotable fins disposed in said case for deflecting wind from the air discharge port;
    a joint to which said vertical fins are linked and pivotally joined;
    a rod coupled to said joint via a friction clutch section;
    drive means connected to said rod for reciprocating said rod, wherein
    said rod engages with said friction clutch section within a range greater than the width of said friction clutch section, said rod within said range being formed to taper from both ends of said range to a point within said range.

6. The wind direction controlling apparatus of claim 5 wherein said rod is formed with a continuous curvature from one end of said range to the other end of said range.

7. A wind direction controlling apparatus comprising:
    a plurality of linked fins disposed in the airflow of a vent, said fins being movable to control the direction of the airflow;
    a driver for imparting a movement force on said linked fins;
    a friction coupling, slidably connecting said driver to said linked fins and limiting the force said driver can apply to said linked fins, including;
    a rod coupling said driver to said linked fins to transfer said movement force, and
    a slidable connector connected to said linked fins and slidable across said rod; wherein
    said slidable connector connected to said linked fins is slidable across said rod within a range of said rod, and
    said rod within said range has an outer surface with a continuous curvature from both ends of the range to a point within the range, and the rod is thinner at the point within the range than at the ends of the range.

8. The apparatus of claim 7 wherein
    the outer surface of said rod is smooth from one end of the range to the other end of the range.

9. A wind direction controlling apparatus comprising:
    a plurality of linked fins disposed in the airflow of a vent, said fins being movable to control the direction of the airflow;
    a driver for imparting a movement force on said linked fins;
    a friction coupling, slidably connecting said driver to said linked fins and limiting the force said driver can apply to said linked fins, including;
    a rod coupling said driver to said linked fins to transfer said movement force, and
    a slidable connector connected to said linked fins and slidable across said rod; wherein
    said slidable connector connected to said linked fins is slidable across said rod within a range of said rod, and
    said rod within said range tapers from the ends of the range to a point within the range, the width of the rod at the point being the thinner than any other point within the range.

10. A wind direction controlling apparatus comprising:
    a plurality of linked fins disposed in the airflow of a vent, said fins being movable to control the direction of the airflow;
    a driver for imparting a movement force on said linked fins;
    a friction coupling, slidably connecting said driver to said linked fins and limiting the force said driver can apply to said linked fins, including;
    a rod coupling said driver to said linked fins to transfer said movement force, and
    a slidable connector connected to said linked fins and slidable across said rod; wherein
    said slidable connector connected to said linked fins is slidable across said rod within a range of said rod, and
    said rod has a varying surface roughness within the range.

11. The apparatus of claim 10 wherein
    said rod has a surface roughness which imparts a higher coefficient of friction on the outer ends of the range than in the middle of the range.

* * * * *